Patented Sept. 30, 1952

2,612,485

UNITED STATES PATENT OFFICE 2,612,485

AQUEOUS DISPERSIONS CONTAINING A WATER-SOLUBLE SULFONATED POLYSTYRENE

Massimo Baer and Reid G. Fordyce, Springfield, Mass., assignors to Monsanto Chemical Company, St. Louis, Mo., a corporation of Delaware No Drawing. Application August 11, 1949, Serial No. 109,814

7 Claims. (Cl. 260—29.6)

This invention relates to new emulsifying agents and protective colloids. More particularly the invention relates to the use of water-soluble sulfonated polystyrene or the salts thereof as emulsifying agents, protective colloids and thickening agents for fluid media.

Water-soluble sulfonated polystyrenes are extremely difficult to prepare. The reaction between polystyrene and sulfur trioxide, chlorosulfonic acid, etc. generally results in an insoluble product. Under controlled conditions, a water-soluble product may be prepared with sulfuric acid as the sulfonating agent but it is next to impossible to remove excess sulfuric acid from the product by any practical methods. However, water-soluble sulfonated polystyrenes may be made by using as a sulfonating agent a coordination complex of sulfur trioxide with either bis-(beta-chlorethyl) ether or dioxane. These methods are the subject of copending applications S. N. 109,811 now Patent 2,533,210 and S. N. 109,812 now Patent 2,533,211, filed August 11, 1949, in the name of Massimo Baer. As shown in said applications, water-soluble polystyrenes may be made having a wide range of molecular weights and viscosity in aqueous solutions.

One object of this invention is to provide new emulsifying agents, protective colloids and thickening agents for fluid media.

Another object is to provide stable emulsions and dispersions.

Still another object is to provide a method for thickening fluid media.

These and other objects are attained by incorporating water-soluble sulfonated polystyrene or water-soluble salts thereof in liquid media, emulsions or dispersions.

The following examples are given in illustration and are not intended as limitations on the scope of this invention. Where parts are mentioned they are parts by weight.

Example I

Two slurries or suspensions of mud were prepared by adding 150 parts of mud to 100 parts of water and thoroughly dispersing the mud throughout the water by vigorous agitation. The mud employed was a viscous material consisting essentially of finely divided clay particles and a small amount of water. One of the mud suspensions was tested without further addition. The second suspension was modified by the admixture with 10 parts of the sodium salt of a sulfonated polystyrene. The viscosity of the two suspensions, as determined on the Brookfield viscosimeter using the #2 spindle at 30 R. P. M., was radically different. The untreated suspension had a viscosity of 156 cps. and the treated suspension had a viscosity of 660–680 cps.

The two suspensions were further examined for the rate of sedimentation and for the ease of redispersion of the clay particles in the water. Within two hours, sedimentation was pronounced in the untreated dispersion and within two days, it was nearly complete. The treated dispersion showed substantially no sedimentation in two hours and even after two days only a portion of the clay particles had settled out of the water. Furthermore, it was found extremely difficult to redisperse the clay in the untreated water after the two day settling period whereas redispersion was almost instantaneous in the treated slurry upon gentle agitation.

The sulfonated polystyrene used in Example I was prepared from a polystyrene having a molecular weight of about 60,000, as determined by the Staudinger equation, and contained about 1.2 sodium sulfonate groups per styrene unit. The sodium salt was used so that the aqueous medium would be as nearly neutral as possible. Other salts of the sulfonated polystyrenes may be used such as the potassium, lithium, rubidium, cesium, calcium and magnesium salts. In fact, the sulfonated polystyrenes are particularly useful in thickening muds such as oil drilling muds due to the solubility of the calcium and magnesium salts thereof in water. Many of the oil drilling muds contain substantial amounts of calcium and magnesium ions which precipitate most of the known thickeners and dispersing agents for said muds.

Example II

Aqueous stable emulsions of polyvinyl chloride containing about 55% solids were modified with three different concentrations of a sodium salt of sulfonated polystyrene. Prior to the modification, the latices had a viscosity of about 30 cps., as measured on a Brookfield viscosimeter at a spindle speed of 30 R. P. M. and a temperature of 25° C. One hundred parts of the latex were modified by the addition of 5 parts of a sodium salt of a sulfonated polystyrene in 2% aqueous solution. The resultant emulsion had a viscosity of 200 cps. When the amount of the additive was increased to 10 parts, the viscosity increased to 650 cps. and when the amount of additive was further increased to 20 parts, the viscosity was 1740 cps.

Example III

Polystyrene latices having a solids content of about 45% and an original viscosity of about 20 cps., measured as shown above, were modified respectively, with 5 and 10 parts of the sodium salt of a sulfonated polystyrene in a 2% aqueous solution. Five parts of the sulfonated polystyrene raised the viscosity of the aqueous dispersion to about 200 cps. and 10 parts increased the viscosity to about 400 cps.

The sulfonated polystyrene used in Example II had a molecular weight of about 400,000 and was sulfonated to the extent of about 1 sulfonic acid group per styrene unit. The sulfonated polystyrene used in Example III was prepared from a polystyrene having a molecular weight of about 60,000 and contained about 0.5 sulfonic acid group per styrene unit.

The sulfonated polystyrenes are particularly valuable for raising the viscosity of aqueous emulsions since they are completely soluble in water over the entire pH range i. e., 1–14, their aqueous solutions show no change in viscosity over a pH range of from 3–10 and within the latter pH range, the aqueous solutions are stable in storage over prolonged periods and their viscosities do not change substantially on heating. Furthermore, the sulfonated polystyrenes are not precipitated by calcium, magnesium and iron ions which are frequently present in aqueous emulsions or dispersions and which do precipitate many of the known thickening agents. In addition, the amount of thickening per unit weight of sulfonated polystyrene may be varied by varying the molecular weight of the polystyrene which is sulfonated. Thus, extremely small amounts of a sulfonated polystyrene, made from a resin having a molecular weight of about 400,000, will substantially raise the viscosity of the aqueous latex or dispersion to which it is added. On the other hand, if it is desired to have a combination of thickening action and protective colloid effect, a polystyrene having a molecular weight as low as 10,000 may be used to prepare the sulfonated polystyrene. Such a compound will be used in larger quantities to obtain substantially the same amount of thickening and will also render the latices extremely stable.

For most latices and dispersions it is desirable to use a neutral salt of the sulfonated polystyrene such as the sodium, potassium, lithium, rubidium, cesium, calcium or magnesium salts thereof since a strongly acid compound such as the sulfonated polystyrene will tend to coagulate many latices and dispersions. However, for some dispersions and latices it is desirable to add an acidic component and the free polystyrene sulfonic acids are particularly desirable for these materials.

The water-soluble sulfonated polystyrenes and the water soluble-salts thereof are also suitable as emulsifying agents and protective colloids. They may be used as the sole emulsifying agent or they may be used in conjunction with other well known emulsifiers. In acidic systems, the free acids will be used and the salts will be employed in other systems.

Example IV

To prepare a stable plasticized polystyrene emulsion, 2100 parts of water, 8 parts of the sodium salt of a sulfonated polystyrene, 160 parts of 28% ammonium hydroxide, 80 parts of oleic acid and 80 parts of sodium pyrophosphate were charged to a polymerization kettle and the solution was heated to reflux temperature. One hundred parts of styrene were mixed with 500 parts of butyl benzyl phthalate and the mixture was added to the solution in the kettle with agitation. The pH of the reaction mixture was adjusted to about 10 with sodium hydroxide. A solution of 1.6 parts of potassium persulfate in 80 parts of water was divided into eight equal portions. One of these portions was added at the beginning of the reaction and the remainder were added, one by one, at fifteen minute intervals. The polymerization reaction was carried out at reflux temperature and atmospheric pressure with constant agitation for about 2 hours. The product was an extremely stable emulsion which could be used for coating and impregnating purposes. The conversion of monomer to polymer was about 99% complete at the end of the reaction.

The sulfonated polystyrene salt used in Example IV was prepared from a polystyrene having a molecular weight of about 60,000 and contained about 1 sulfonic acid group per styrene unit. Other water-soluble sulfonated polystyrenes and other water-soluble salts of sulfonated polystyrene may be employed with equal effectiveness. Moreover, the ammonium oleate may be left out of the formulation of Example IV and replaced by more of the same or a different polystyrene sulfonic acid salt to obtain similar results. The water-soluble sulfonated polystyrenes and their salts may also be used in the emulsion polymerization of other vinyl monomers and mixtures of the same. They may also be used to prepare emulsions from resinous polymers and copolymers which have been obtained by other polymerization methods. For example, they may be employed in the emulsification of polyvinyl acetal resins which are obtained by acetalizing partially hydrolyzed polyvinyl esters.

The sulfonated polystyrenes which may be used in the processes and products of this invention are prepared by the reaction of a coordination complex of sulfur trioxide and either dioxane or bis-(beta-chlorethyl) ether on polystyrene in solution in a halogenated aliphatic organic solvent. The properties of the sulfonated polystyrenes may be varied by varying the molecular weight of the polystyrene between 10,000 and 500,000, as determined by the Staudinger equation, and by varying the amount of sulfonation between the limits of 0.5 to 2 sulfonic acid groups per styrene unit. Within these limits the sulfonated polystyrenes are completely water-soluble over the entire pH range, and within the pH range of 3 to 10 they are stable to storage and heat.

In some cases it may be desirable to increase the viscosity of the sulfonated polystyrene. This may be done by heating the compounds at 15–60° C., at a pH of less than 3, over a short period of time or it may be accomplished by further sulfonation with sulfur trioxide in substantially anhydrous media with or without the use of the coordination complex. In any event, completely water-soluble products are available over a wide range of viscosities, which are extremely useful as emulsifying agents and protective colloids for aqueous dispersion of organic and inorganic materials. In a majority of cases it is advantageous to use a substantially neutral emulsifying agent such as the alkali metal salts of the sulfonated polystyrenes. The calcium and magnesium salts may also be used and therein lies one of the important advantages of this invention since the solubility of the calcium and magnesium salts means that the compounds may be used in latices and dispersions containing substantial quantities of calcium and magnesium ions without precipitation of the emulsifying agents.

The amount of the water-soluble polystyrenes or salts thereof to be used will depend to a large extent on the nature of the material being emulsified and to the type of latex or dispersion desired. In general, from 0.1 to 10 parts of sulfonated polystyrene or salt thereof will be required for each 100 parts of solids in the latex or dispersion. Less than 0.1 part has little or no effect on the properties of aqueous emulsions or dispersions and more than ten parts change the characteristics of the emulsions or dispersions so greatly that they no longer serve the specific purpose for which they were formulated.

The water-soluble sulfonated polystyrenes and their salts are efficient dispersing or emulsifying agents and protective colloids for aqueous dispersions and emulsions of inorganic and organic materials. Thus, they are equally efficient in thickening dispersions of clays and muds and holding said clays and muds in more permanent suspension, and in the emulsion polymerization and copolymerization of organic compounds, as well as in the dispersion of natural and synthetic organic compounds in aqueous media.

The combination of the water-soluble sulfonated polystyrenes with oil-well drilling muds is set forth in greater detail and is claimed in copending application S. N. 147,140 filed March 1, 1950 which is a continuation-in-part of this application.

It is obvious that many changes may be made in the products and processes of this invention without departing from the spirit and scope thereof as defined by the appended claims.

What is claimed is:

1. An aqueous dispersion containing 100 parts of an aqueous emulsion of an organic resin taken from the group consisting of polyvinyl chloride and polystyrene and 5 to 20 parts of the sodium salt of a completely water-soluble sulfonated polystyrene.

2. A dispersion as in claim 1 wherein the organic resin is polyvinyl chloride.

3. A dispersion as in claim 1 wherein the organic resin is polystyrene.

4. A dispersion as in claim 1 wherein the sulfonated polystyrene has a molecular weight of about 400,000 and contains about 1 sulfonic acid group per styrene unit.

5. A dispersion as in claim 1 wherein the sulfonated polystyrene has a molecular weight of about 60,000 and contains about 0.5 sulfonic acid group per styrene unit.

6. An aqueous dispersion containing 100 parts of a polyvinyl chloride emulsion and from 5 to 20 parts of the sodium salt of a sulfonated polystyrene having a molecular weight of about 400,000 and containing about 1 sulfonic acid group per styrene unit.

7. An aqueous dispersion containing 100 parts of a polystyrene latex and from 5 to 20 parts of the sodium salt of a sulfonated polystyrene having a molecular weight of about 60,000 and containing about 0.5 sulfonic acid group per styrene unit.

MASSIMO BAER.
REID G. FORDYCE.

REFERENCES CITED

The following references are of record in the file of this patent:

UNITED STATES PATENTS

| Number | Name | Date |
| --- | --- | --- |
| 2,031,929 | Breuers | Feb. 25, 1936 |
| 2,238,956 | Strother | Apr. 22, 1941 |
| 2,283,236 | Soday | May 19, 1942 |
| 2,533,210 | Baer | Dec. 12, 1950 |
| 2,533,211 | Baer | Dec. 12, 1950 |

FOREIGN PATENTS

| Number | Country | Date |
| --- | --- | --- |
| 580,366 | Germany | July 13, 1933 |